United States Patent [19]

von Rauch

[11] Patent Number: 4,637,257
[45] Date of Patent: Jan. 20, 1987

[54] PRESSURE DIFFERENCE MEASURING DEVICE WITH A SEMICONDUCTOR PRESSURE SENSOR

[75] Inventor: Moriz von Rauch, Berlin, Fed. Rep. of Germany

[73] Assignee: Siemens Aktiengesellschaft, Munich, Fed. Rep. of Germany

[21] Appl. No.: 798,564

[22] Filed: Nov. 15, 1985

[30] Foreign Application Priority Data

Nov. 26, 1984 [DE] Fed. Rep. of Germany ....... 3443419

[51] Int. Cl.⁴ ............................ G01L 7/08; G01L 9/00
[52] U.S. Cl. ........................................ 73/706; 73/717; 73/DIG. 4
[58] Field of Search ................. 73/706, 717, 718, 719, 73/720, 721, 722, DIG. 4

[56] References Cited

U.S. PATENT DOCUMENTS

| | | | |
|---|---|---|---|
| 4,028,945 | 6/1977 | Bergamini | 73/706 |
| 4,135,407 | 1/1979 | Ezekier | 73/706 |
| 4,135,408 | 1/1979 | DiGiovanni | 73/706 |
| 4,527,428 | 7/1985 | Shimada et al. | 73/706 |
| 4,546,653 | 10/1985 | Tobita et al. | 73/706 |
| 4,563,901 | 1/1986 | Singh | 73/706 |

FOREIGN PATENT DOCUMENTS 3047276 9/1981 Fed. Rep. of Germany .
3222620 8/1983 Fed. Rep. of Germany .

*Primary Examiner*—Donald O. Woodiel
*Attorney, Agent, or Firm*—Kenyon & Kenyon

[57] ABSTRACT

A pressure difference measuring device having a semiconductor pressure sensor in a pressure pickup body which supports at each end face thereof a separating diaphragm with an adjacent supplemental diaphragm. On both sides of the semiconductor pressure sensor, a connecting canal is provided which leads in spur canals to the separating diaphragms and the supplemental diaphragms. In order to equip a pressure difference measuring device of this type with mechancial damping without adverse consequences for the oepration of the overload protection, a damping element is arranged in at least one connecting canal. An equalizing diaphragm is associated with the semiconductor pressure sensor, the two sides of which are connected by the connecting canals in the region between the semiconductor pressure sensor and the damping element.

2 Claims, 2 Drawing Figures

4,637,257

PRESSURE DIFFERENCE MEASURING DEVICE WITH A SEMICONDUCTOR PRESSURE SENSOR

BACKGROUND OF THE INVENTION

The present invention relates to a pressure difference measuring device with a semiconductor pressure sensor in a pressure pickup body which supports at the end faces thereof respective separating diaphragms, each diaphragm having an adjacent supplemental diaphragm, and wherein connecting canals lead from both sides of the semiconductor pressure sensor. The device further includes a spur canal starting out from each connecting canal, at its end facing away from the semiconductor pressure sensor, leading to a respective separating diaphragm. Respective further spur canals lead from the same connecting canals to the supplemental diaphragms associated with opposite ones of the separating diaphragms.

Such a pressure difference measuring device is known from DE-OS 32 22 620. In this known measuring device, the advantageous possibility is created due to the use of two supplemental diaphragms adjacent to the separating diaphragms, as overload protection, to accommodate the semiconductor pressure senosr within the pressure pickup body, whereby the entire pressure difference measuring device is given a very compact design. Since the semiconductor pressure sensor of the known pressure difference measuring device reacts to changes of the pressure difference with very little inertia, damping is required to obtain a measurement quantity which can be processed further.

SUMMARY OF THE INVENTION

It is therefore an object of the present invention to provide a pressure difference measuring device of the type described above, having mechanical damping which precludes, without detrimental influence on the overload protection, endangering the semiconductor pressure sensor by the supplemental diaphragms under all operating conditions.

To solve this problem, a damping element is arranged, in the pressure difference measuring device of the type described, in at least one connecting canal, and an equalizing diaphragm is associated with the semiconductor pressure sensor having a stiffness which is greater than that of the supplemental diaphragms, but smaller than that of the semiconductor pressure sensor. Both sides of the equalizing diaphragm are connected by a respective connecting canal in the area between the semiconductor pressure sensor and the damping element.

It is an essential advantage of the pressure difference measuring device according to the invention that, due to the chosen attachment of the damping element in conjunction with the equalizing diaphragm, danger to the semiconductor pressure sensor is precluded also if, after a sudden elimination of a high static overpressure, the pressure transmission liquid which had been compressed until then, expands again in the interior of the pressure pickup body. Because of the damping element in the at least one connecting canal, the expansion of the pressure transmission liquid can take place with different speeds, whereby an overpressure could be produced in the semiconductor pressure sensor if this overpressure were not taken up by the equalizing diaphragm which is connected, so to speak, parallel thereto. By the way, the danger of damage due to overpressure in the operating case described would be obtained also if a damping element is arranged in every connecting canal because volumes of different size of the pressure transmission liquid on both sides of the semiconductor pressure sensor are practically unavoidable.

While from DE-OS 30 47 276, a pressure difference measuring device with a semiconductor pressure sensor is known in which a damping element is provided in a canal starting from a chamber of a separating diaphragm, the damping element is located there at an entirely different point because the known measuring device involves a pressure difference measuring device of an entirely different type since in the pressure difference measuring device according to DE-OS 30 47 276, there is arranged between the two separating diaphragms for protection against overload of a semiconductor pressure sensor, a central diaphragm in the pressure pickup body in a plane parallel to the separating diaphragm, from which canals lead on both sides to the separating diaphragms and to the semiconductor pressure sensors. Therefore, the semiconductor pressure sensor is arranged hydraulically parallel to the central diaphragms. If an overload is transmitted to the pressure pickup body of the known measuring device from the outside via a separating diaphragm, then the volume shift caused by the separating diaphragm is taken up by an excursion of the central diaphragm so that the semiconductor pressure sensor is protected against the overload. This is true also if the pressure transmission liquid which is compressed by a high static overpressure, expands suddenly after the static overpressure ceases, because unequal expansions occurring due to the damping element have no effect on the semiconductor pressure sensor because of the central diaphragm which is parallel to the semiconductor pressure sensor. However, this is possible only by the described arrangement of the central diaphragm and by accommodating the semiconductor pressure sensor outside the pressure pickup body in a supplemental flanged-on housing.

In the pressure difference measuring device according to the invention, the equalizing diaphragm is advantageously arranged immediately adjacent to the semiconductor pressure sensor and the one connecting canal ends in the region between the semiconductor pressure sensor and the equalizing diaphragm. An additional canal leads from the other connecting canal to the side of the equalizing diaphragm facing away from the semiconductor pressure sensor. This design has primarily the advantage that a chamber accommodating the semiconductor pressure sensor can concurrently be used also for accommoodating the equalizing diaphragm, and that only a single additional canal for connecting the equalizing diaphragm is required.

BRIEF DESCRIPTION OF THE DRAWINGS

The invention will be explained in greater detail in the following detailed description with reference to the drawings, in which.

DETAILED DESCRIPTION

Figure 1:
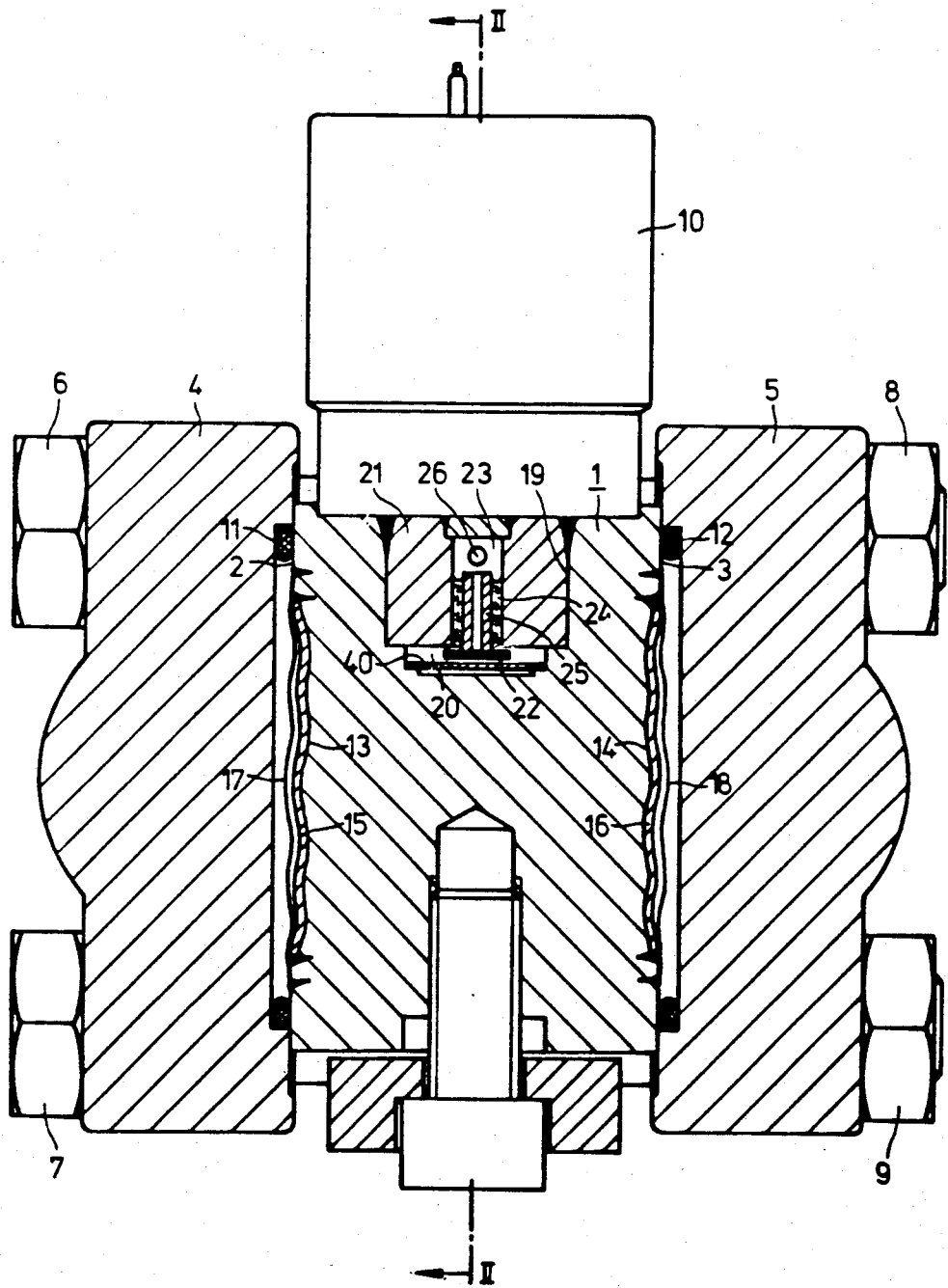
FIG. 1 shows a section through an embodiment of the pressure difference measuring device according to the invention taken transversely to the plane of the diaphragms.
Figure 2:
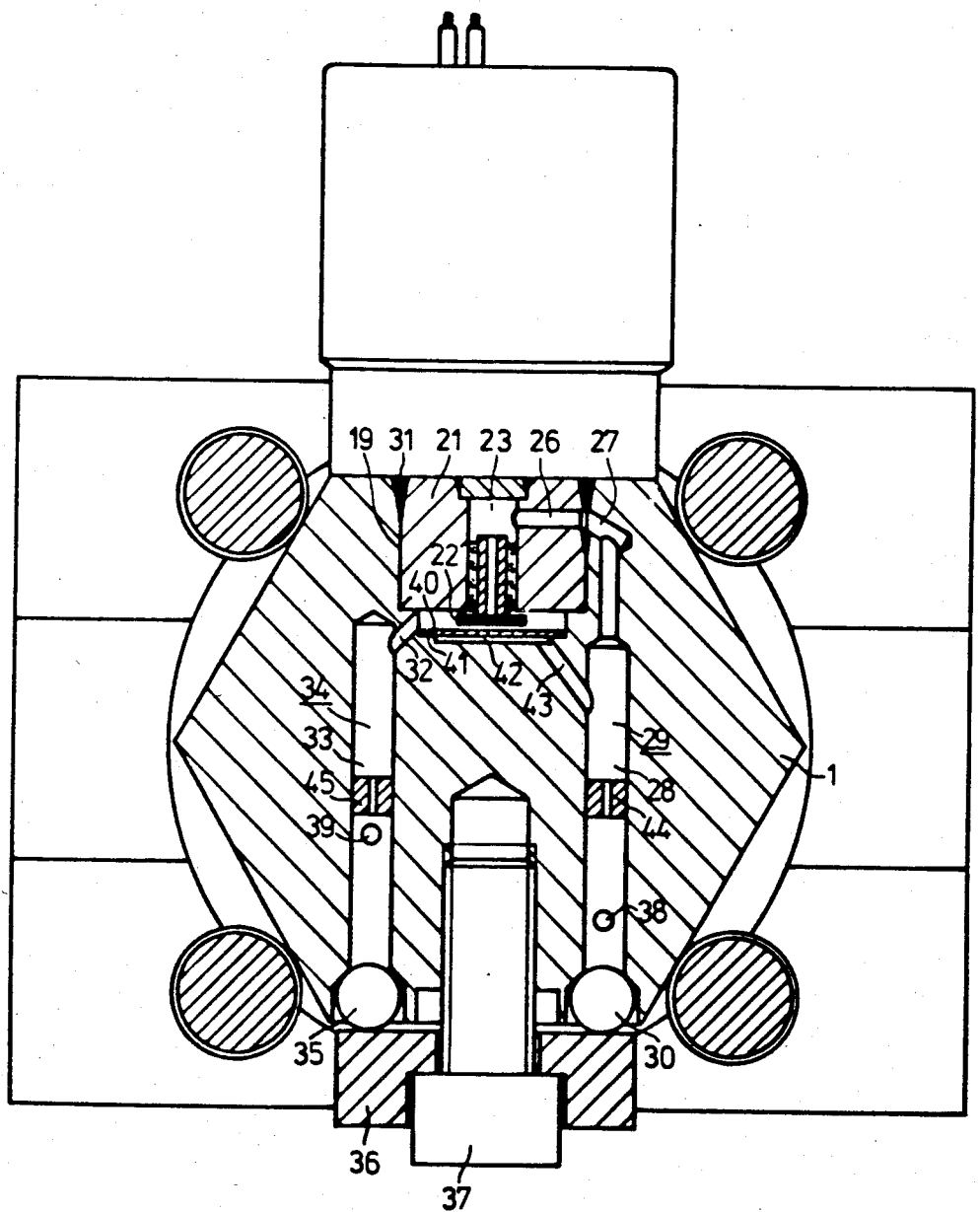
FIG. 2 shows a section perpendicular to the first sectional plane through the same embodiment.

With reference now to the drawings, an embodiment of a pressure difference measuring device shown in FIGS. 1 and 2 has a pressure pickup body 1 which is covered at both its end faces 2 and 3 by housing caps 4 and 5. Via openings in the housing caps, not visible, the measuring device is connected to the medium, the pressure difference of which is to be determined. The pressure pickup body 1 and the housing caps 4 and 5 are clamped together by means of threaded bolts 6 and 7 as well as nuts 8 and 9. In the area between the housing caps 4 and 5, there is a housing 10, in the figures above the pressure pickup body 1, in which the electronic circuit of the measuring device or parts of the circuit are accommodated. For the sake of greater clarity, only the external outlines of the housing 10 are shown in the figures.

As shown particularly in FIG. 1, the housing caps 4 and 5 are pressed against the pressure pickup body 1 by sealing rings 11 and 12, respectively. The pressure pickup body 1 is designed at both its end faces 2 and 3 in such a manner that a diaphragm bed 13 and 14 is formed there. To the pressure pickup body is welded at both end faces 2 and 3 an additional diaphragm 15 and 16, respectively, the supplemental diaphragms 15 and 16 each having a pre-tension such that they are pressed against the respective diaphragm beds 13 and 14. Separating diaphragms 17 and 18 respectively are arranged likewise at the end faces 2 and 3 of the pressure pickup body 1. The supplemental diaphragms 15 and 16 have a smaller diameter than the separating diaphragms 17 and 18.

In the circumferential region between the diaphragms, the pressure pickup body 1 has a cup-like recess 19 which has, in the embodiment shown, a further recess 20 toward the interior of the pressure pickup body 1 with smaller dimensions. Into the cup-like recess 19, a support body 21 of a semiconductor pressure sensor 22 is inserted. The support body 21 is provided with a longitudinal drill hole 23 which is welded shut at the top and in which a small tube 25 is held by means of fused glass 24. This tube 25 protrudes slightly downward from the support body 21 and from the longitudinal hole 23. To the protruding end of the tube 25, the semiconductor pressure sensor 22 is arranged hermetically sealed. This may involve a semiconductor pressure sensor of known design (see in this connection, for instance, DE-OS 26 17 731).

As shown particularly in FIG. 2, the support body 21 has a transverse drill hole 26 which extends from the longitudinal hole 23 to the edge of the support body 21. In the inserted condition, the transverse hole 26 ends in a pressure-transmitting canal 27 in the pressure pickup body 1. The pressure-transmitting canal 27 forms, together with the transverse hole 26 and a canal section 28, a connecting canal 29 which leads away from the upper side (in the figures) of the semiconductor pressure sensor 22; the connecting canal 29 is sealed from the outside via a ball seal 30.

The support body 21 is firmly connected to the pressure pickup body 1 at its outer edge by means of a welded joint 31. Care is taken here by the location of the transverse hole 26 and the design of the welded connection 31 that in the region of the transition from the transverse hole 26 to the pressure transmitting canal 27, a seal around the transition point is produced, leaving a passage opening free. The pressure in the pressure-transmitting canal 27 can therefore not get in an undesirable manner to the cylindrical parting gap between the support body 21 and the pressure pickup body 1 along the lower side of the semiconductor pressure sensor 22 which is located in the further recess 20, for into this further recess 20 opens a further pressure transmitting canal 32. The further pressure-transmitting canal 32 is connected to a wider canal section 33 which, together with the further pressure transmitting canal 32, forms a wider connecting canal 34 which is sealed to the outside by a further ball 35. The two balls 30 and 35 are pressed against their sealing point via a pressure piece 36 and a threaded bolt 37. Both connecting canals 29 and 34 lie in the same plane which represents a plane parallel to the end faces 2 and 3 of the pressure pickup body 1.

In the embodiment shown having two separating diaphragms 17 and 18 and the two supplemental diaphragms 15 and 16, two spur canals and two further spur canals start from the respective connecting canals 29 and 34, of which only one spur canal 38 and one further spur canal 39 are visible in FIG. 2. Of these canals, the one spur canal 38 leads to the separating diaphragm 17 and the further spur canal 39 to the supplemental diaphragm 15 to one and the same end face 2 of the pressure pickup body 1. A second further spur canal, not shown, leads from the connecting canal 29 to the supplemental diaphragm 16 and a second spur canal (likewise not shown) leads from the wider connecting canal 34 to the separating diaphragm 18. All canals in the interior of the pressure pickup body 1 as well as the transverse hole 26 and the wider recess 20 are filled with a pressure transmission liquid.

In the recess 20 of the pressure pickup body 1, an equalizing diaphragm 40 is attached by welding it at its edge to the bottom 41 of the recess 20 in a manner not shown. Underneath the equalizing diaphragm 40 there is an empty space 42 filled with pressure transmitting liquid which permits a deflection of the equalizing diaphragm 40. Into this empty space 42 opens an additional canal 43 which leads to the one connecting canal 29. The equalizing diaphragm 40 is therefore arranged parallel to the semiconductor pressure sensor 22.

In the embodiment shown, damping elements 44 and 45, respectively, are located in connecting canals 29 and 34, and more specifically, at a point between the semiconductor pressure sensor 22 and the start of the spur canals 38 and 39. These damping elements are provided so that the measured quantity delivered by the semiconductor pressure sensor is not influenced by short pressure shocks, which would otherwise be the case because of the very low inertia behavior of the sensor.

In the normal operating condition of the pressure difference measuring device, the pressure transmitting liquid is compressed within the pressure pickup body 1 and therefore also in the region between the damping elements 44 and 45 and the semiconductor pressure sensor 22 due to the static pressure. If the static pressure suddenly ceases, the pressure transmitting liquid in the pressure pickup body 1 and therefore also in the region between the damping elements 44 and 45 and the semiconductor sensor 22 expands. Due to the volume of the pressure transmitting liquid, which is, as a rule, of different magnitude on both sides of the semiconductor pressure sensor 22, a pressure difference could result during this expansion of the pressure transmission liquid which damages the semiconductor pressure sensor 22. Such a dangerously high pressure difference, however, does not come about in the measuring device because the latter is inhibited by an equalizing diaphragm 40, the stiffness of which is greater than that of the supplemental diaphragm 16 and 17 and smaller than that of the semiconductor pressure sensor 22.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. A pressure difference measuring device having a semiconductor pressure sensor in a pressure pickup body and having at each end face thereof a separating diaphragm with an adjacent supplemental diaphragm, wherein on both sides of the semiconductor pressure sensor a connecting canal is provided and from each connecting canal, at an end facing away from the semiconductor pressure sensor, a spur canal is provided which leads to a respective separating diaphragm and a further spur canal is provided which leads to a respective supplemental diaphragm adjacent to the other separating diaphragm, and further comprising a damping element arranged in at least one connecting canal, the semiconductor pressure sensor being associated with an equalizing diaphragm having a stiffness which is greater than that of the supplemental diaphragms but less than that of the semiconductor pressure sensor, both sides of the equalizing diaphragm being connected to respective ones of the connecting canals in the region between the semiconductor pressure sensor and the damping element.

2. The measuring device recited in claim 1, wherein the equalizing diaphragm is arranged immediately adjacent to the semiconductor pressure sensor and one of said connecting canals ends in a region between the semiconductor pressure sensor and the equalizing diaphragm, an additional canal being provided which leads from the other of said connecting canals to the side of the equalizing diaphragm facing away from the semiconductor pressure sensor.

* * * * *